(12) United States Patent
Zhou

(10) Patent No.: US 12,600,428 B1
(45) Date of Patent: Apr. 14, 2026

(54) ELECTRIC SWING CAR

(71) Applicant: Xiang Zhou, Anqing (CN)

(72) Inventor: Xiang Zhou, Anqing (CN)

( * ) Notice: Subject to any disclaimer, the term of this patent is extended or adjusted under 35 U.S.C. 154(b) by 0 days.

(21) Appl. No.: 19/014,426

(22) Filed: Jan. 9, 2025

(51) Int. Cl.
| | |
|---|---|
| *B62K 5/01* | (2013.01) |
| *B62J 1/08* | (2006.01) |
| *B62J 1/18* | (2006.01) |
| *B62J 25/04* | (2020.01) |
| *B62K 5/08* | (2006.01) |
| *B62K 9/00* | (2006.01) |
| *B62K 9/02* | (2006.01) |

(52) U.S. Cl.
CPC *B62K 5/01* (2013.01); *B62J 1/08* (2013.01); *B62J 1/18* (2013.01); *B62J 25/04* (2020.02); *B62K 5/08* (2013.01); *B62K 9/00* (2013.01); *B62K 9/02* (2013.01)

(58) Field of Classification Search
CPC ... B62K 9/00; B62K 9/02; B62K 5/01; B62K 5/02; B62K 5/023; B62K 5/025; B62K 5/027; B62K 5/05; B62K 5/06; B62K 5/08; B62K 5/10; B62J 1/08; B62J 1/18; B62J 25/04
See application file for complete search history.

(56) References Cited

U.S. PATENT DOCUMENTS

| | | | | |
|---|---|---|---|---|
| 3,605,929 A | * | 9/1971 | Rolland | B62D 61/08 |
| | | | | 280/DIG. 5 |
| 4,560,022 A | * | 12/1985 | Kassai | B60L 50/52 |
| | | | | 180/6.66 |
| 6,105,982 A | * | 8/2000 | Howell | B62D 7/026 |
| | | | | 280/91.1 |
| 6,386,304 B1 | * | 5/2002 | Wang | A63G 25/00 |
| | | | | 74/25 |
| 6,464,029 B2 | * | 10/2002 | Gu | B62K 9/00 |
| | | | | 180/65.6 |
| 6,631,925 B1 | * | 10/2003 | Lawson, Jr. | B62D 21/183 |
| | | | | 180/291 |
| 6,712,167 B2 | * | 3/2004 | Gu | B62K 9/00 |
| | | | | 280/240 |
| 7,007,975 B2 | * | 3/2006 | Taylor | B62K 9/00 |
| | | | | 180/208 |
| 7,464,784 B2 | * | 12/2008 | Chiu | B62K 5/025 |
| | | | | 180/208 |
| 8,820,460 B2 | * | 9/2014 | Chen | B62K 5/027 |
| | | | | 280/288.1 |
| 10,335,696 B2 | * | 7/2019 | McVeen | A63G 25/00 |

(Continued)

*Primary Examiner* — Laura Freedman
(74) *Attorney, Agent, or Firm* — IPro, PLLC

(57) ABSTRACT

The electric swing car includes: a vehicle body, a power supply device provided within the vehicle body, a connecting shaft penetrating through the vehicle body along a predetermined direction, a steering control member fixedly connected to a first end of the connecting shaft, a guide frame fixedly connected to a second end of the connecting shaft, a driving device provided within the guide frame, a plurality of wheels assembled on the vehicle body and the guide frame, a conductive ring electrically connected to the driving device, wherein the conductive ring is disposed on the guide frame, a contact member connected to the vehicle body, wherein the contact member maintains physical contact with the conductive ring, and the contact member is made of conductive material and is electrically connected to the power supply device.

20 Claims, 9 Drawing Sheets

(56) References Cited

U.S. PATENT DOCUMENTS

| | | | |
|---|---|---|---|
| 11,358,671 B2 * | 6/2022 | Shibuya | .................. B62K 5/05 |
| 12,054,219 B2 * | 8/2024 | Demond | .................. B62H 1/08 |
| D1,062,894 S * | 2/2025 | Dong | .......................... D21/426 |
| D1,081,819 S * | 7/2025 | Luo | ............................. D21/426 |
| 12,344,348 B2 * | 7/2025 | Zadeh | ..................... B62K 5/06 |
| 2004/0145140 A1 * | 7/2004 | Chen | ....................... B62K 9/00 |
| | | | 280/87.01 |

* cited by examiner

72

731

732

73

ELECTRIC SWING CAR

TECHNICAL FIELD

The present application relates to the field of children's ride-on vehicles, more particularly to an electric swing car.

BACKGROUND

The swing car is a widely popular children's toy. It adopts a split structure design comprising front wheel assembly and rear wheel assembly, wherein the vehicle advances forward through the rider's left and right swaying movements of the steering wheel, which causes the front wheel assembly to swing laterally.

Specifically, both leftward and rightward swinging motions of the front wheel assembly utilize lateral forces (ground friction) on the wheels to first generate lateral rotational power. After the steering wheel returns to center from either left or right position, this power is converted into forward propulsion force in the rolling direction of the wheels.

Taking clockwise steering to the left as an example: the caster wheel in the front wheel assembly located behind the pivot axis rotates clockwise around the axis with the trail distance as radius. However, since the wheel cannot slide laterally, it acts as if a rigid object is pushing against the ground on the left side of the vehicle during turning. The reaction force from this pushing action causes the front section of the vehicle to move rightward.

However, in practical use, this driving method of advancing through left-right steering wheel oscillation has relatively low overall conversion efficiency, poor user comfort, tends to cause fatigue during prolonged use, and insufficient steering flexibility, which adversely affects the operating experience.

SUMMARY

The present application provides an electric swing car. The electric swing car includes: a vehicle body, a power supply device provided within the vehicle body, a connecting shaft penetrating through the vehicle body along a predetermined direction, wherein the connecting shaft has a first end and a second end mutually facing away along the predetermined direction, a steering control member fixedly connected to the first end of the connecting shaft, a guide frame fixedly connected to the second end of the connecting shaft, a driving device provided within the guide frame, a plurality of wheels assembled on the vehicle body and the guide frame, a conductive ring electrically connected to the driving device, wherein the conductive ring is disposed on the guide frame, a contact member connected to the vehicle body, wherein the contact member maintains physical contact with the conductive ring, and the contact member is made of conductive material and is electrically connected to the power supply device.

At least one advantage of the electric swing car according to the present application is: while retaining the manual driving function of traditional swing cars, it additionally incorporates an electric driving function, providing sufficient power for the swing car, which fundamentally resolves the problems of fatigue and insufficient control performance existing in traditional swing cars during use, significantly enhancing the product's practicality and user experience.

BRIEF DESCRIPTION OF THE DRAWINGS

One or more embodiments are illustrated by way of example in corresponding drawings, which exemplary illustrations do not constitute limitations on the embodiments. Elements denoted by identical reference numerals in the drawings represent similar elements unless specifically stated otherwise, and the drawings are not necessarily drawn to scale.

Figure 1:
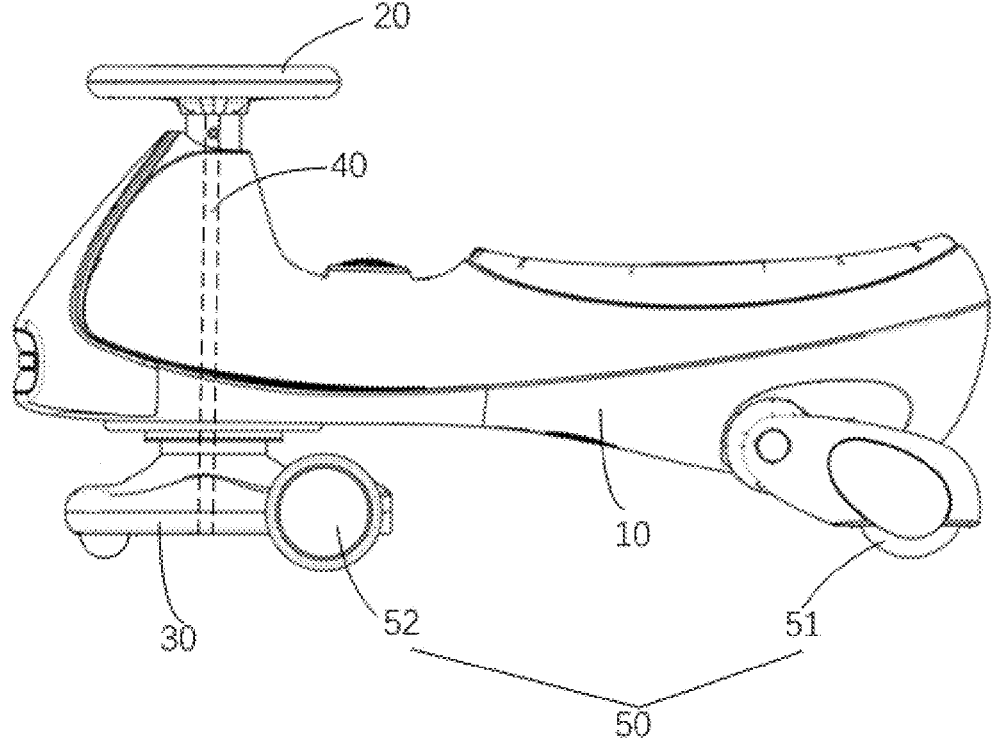
FIG. 1 is a structural schematic view of an electric swing car according to an embodiment of the present application.

REFERENCE NUMERALS vehicle body 10, seat portion 10A, guide portion 10B, foot platform 10C;

vehicle shell 11, main shell 111, seat cover 112, abutting structure 113;

mounting bracket 12, bracket body 121, guide sliding groove 122, terminal post 123, first opening 124, second opening 125, first gap 126, positioning flange 127;

steering control member 20;

guide frame 30, positioning notch 31, support bracket 32, guide frame body 33, second gap 34, first guide frame shell 331, second guide frame shell 332, first ventilation hole 333, second ventilation hole 334;

connecting shaft 40;

wheel 50, rear wheel 51, front wheel 52, hub 53, LED bead 54; drive wheels 521;

anti-tilt wheels 522;

power supply device 61, driving device 62, speed reduction transmission mechanism 621, electric motor 622;

conductive ring 71, contact member 72, flexible constraint member 73, flexible body 731, connection tab 732, elastic element 74;

plate-shaped body 711, fixing portion 712;

speaker 81, sound trigger button 82, electronic throttle pedal 91, power switch 92.

DETAILED DESCRIPTION

The following detailed description of the present application is made in conjunction with specific embodiments. It should be emphasized that the following description is exemplary only and not intended to limit the scope and application of the present application.

It should be noted that, unless explicitly specified and limited otherwise, the terms "central," "longitudinal," "lateral," "upper," "lower," "vertical," "horizontal," "inner," "outer" and other similar orientational or positional relationships used in the present specification indicate orientational or positional relationships based on those shown in the drawings for ease of description and simplified discussion of the present application, and do not indicate or imply that the referred device or element must have a particular orientation, must be constructed in a particular orientation, or must operate in a particular orientation. Therefore, these terms should not be construed as limitations on the present application. Terms such as "mounted," "connected," "coupled," "fixed" and the like should be broadly interpreted. For example, the connection may be a fixed connection, a detachable connection, or an integral connection; may be a mechanical connection or an electrical connection; and may be directly connected or indirectly connected through intermediate media. Furthermore, terms such as "first" and "second" are used merely for descriptive purposes and should not be construed as indicating or implying relative importance or implicitly indicating the number of technical features being referenced. Thus, features defined as "first" and "second" may explicitly or implicitly include one or more of such features. The term "plurality" means two or more; "and/or" includes any and all combinations of one or more of the associated listed items. Those skilled in the art can understand the specific meanings of the above terms in the present application according to specific contexts.

The separated configuration of front and rear wheel assemblies (hereinafter referred to as "split configuration") constitutes the core technical feature enabling twist-driven propulsion of the swing car, and underlies its widespread acceptance as both a mobility device and recreational apparatus. Nevertheless, the incorporation of an auxiliary electric drive system, while maintaining the split configuration, poses substantial technical difficulties and challenges.

During the implementation of the present application, the applicant discovered that the main incompatibility between the split configuration and the electric drive system lies in the following:

Typically, in order to provide the propulsion force of swing cars, the driving device that converts electrical energy into mechanical energy within the electric drive system needs to be positioned inside the front wheel assembly, outputting power to drive some front wheels as active wheels. Meanwhile, the power supply device for providing and storing electrical energy in the electric drive system occupies considerable space and needs to be housed within the main vehicle body where the rear wheel assembly is located. Consequently, the wires establishing the electrical power transmission circuit between the power supply device and the driving device must extend from the main vehicle body to the front wheel assembly.

However, in the split configuration, the front wheel assembly, which can rotate freely relative to the main vehicle body, may cause these wires to become entangled or twisted. To prevent wire twisting or entanglement, additional angle limiting structures may be required to restrict the rotation angle of the front wheel assembly. Such structures not only increase structural complexity but also impose undesirable limitations on the front wheel assembly during manual twist-driven propulsion.

Alternatively, placing the power supply device together with the front wheel assembly could also avoid the situation where wires need to extend from the vehicle body to the front wheel assembly. However, the accommodation space provided by the front wheel assembly is extremely limited, which would significantly restrict the selection and capacity of the power supply device. This may lead to a series of problems such as poor endurance, high implementation costs, and difficulties in structural assembly design.

To address the incompatibility between the split configuration and the electric drive system, the present application provides a novel electric swing car structure. Through the design of a specific electrical contact assembly, it enables the establishment of an electrical power transmission circuit between the front wheel assembly and rear wheel assembly while maintaining the structural design of traditional swing cars.

The inventive concept and implementation principles of the present application will be fully described below in conjunction with specific examples of the electric swing car provided by the present application. FIG. 1 is a structural schematic view of an electric swing car according to an embodiment of the present application.

As shown in FIG. 1, the electric swing car includes: a vehicle body 10, a steering control member 20, a guide frame 30, a connecting shaft 40, and a plurality of wheels 50.

The vehicle body 10 constitutes the main structural framework of the electric twist car. The configuration of the vehicle body 10, including its shape and dimensional parameters, may be implemented in any suitable manner in accordance with practical application requirements, without being limited to any particular configuration described herein.

Figure 2:
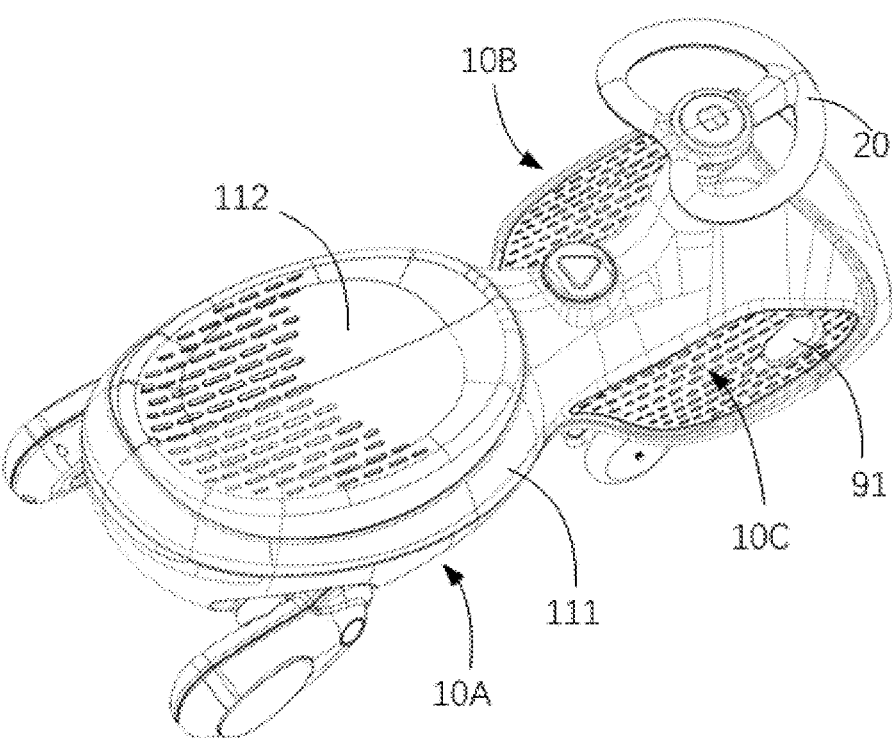
FIG. 2 is a structural schematic view of an electric swing car according to another embodiment of the present application.

Specifically, with reference to the functional configuration shown in FIG. 2, the vehicle body 10 includes a seat portion 10A configured for user seating and a guide portion 10B disposed at the anterior end of the seat portion 10A. Additionally, the vehicle body 10 further includes a footrest platforms 10C, that are provided on lateral sides of the guide portion 10B for supporting a user's feet.

An electronic throttle pedal 91 for controlling the driving device is disposed on one of the footrest platforms. The electronic throttle pedal 91 serves as a control component for regulating the driving device. Users can activate the driving device output by depressing the electronic throttle pedal 91, causing the electric swing car to accelerate forward. Conversely, releasing the electronic throttle pedal 91 causes the driving device to suspend output.

This configuration of the electronic throttle pedal 91 provides convenience for users to control the acceleration/deceleration of the electric swing car, thereby enhancing the user experience.

Alternatively, the electronic throttle pedal 91 for regulating the driving device operation may be implemented through various alternative interactive mechanisms and may be disposed at different positions on the electric swing car. By way of example, the electronic throttle pedal 91 may be configured as a push-actuated component mounted on the steering control member 20. The driving device operation may be controlled through user actuation of the push-actuated electronic throttle, thereby effectuating forward acceleration of the electric swing car.

Figure 3:
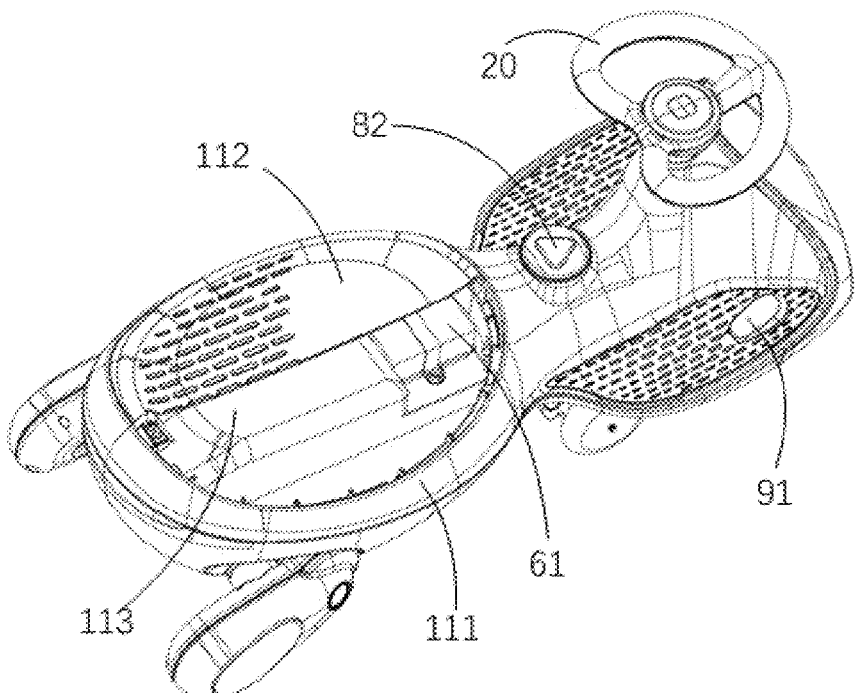
FIG. 3 is a structural schematic view of the electric swing car according to an embodiment of the present application, showing a state with the seat cover removed.

The power supply device 61 encompasses electronic devices configured to provide one or more types of requisite electrical power. The power supply device 61 may comprise, without limitation: power management integrated circuits, energy storage batteries, and control integrated circuits. As illustrated in FIG. 3, the power supply device 61 is disposed within the interior space of the vehicle body 10, which provides substantial volumetric capacity, thereby accommodating enhanced energy storage capacity and broader component selection options for the power supply device 61.

The steering control member 20 is a structural component for user operation to control the direction of the swing car. The steering control member 20 may be implemented, in accordance with practical application requirements, as any suitable configuration of steering wheel or analogous disc-structured assembly that facilitates user grip and rotational manipulation.

Figure 10:
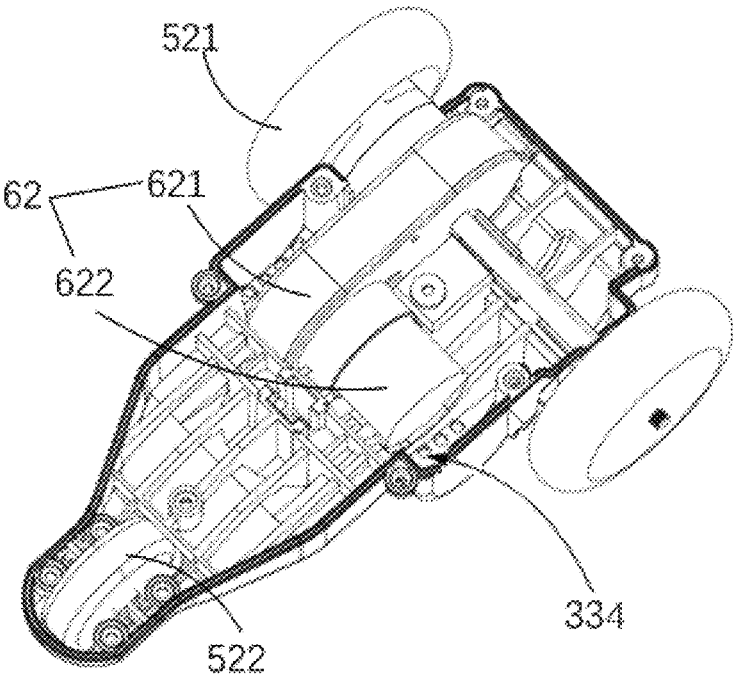
FIG. 10 is a structural schematic view of the guide frame according to an embodiment of the present application, showing a state with the first guide frame main vehicle shell removed.

The guide frame 30 is a structural assembly configured in a separated arrangement relative to the vehicle body 10. With further reference to FIG. 10, the guide frame 30, constituting a portion of the front wheel assembly of the twist car, incorporates therein the driving device 62 configured for power generation.

The driving device 62 encompasses devices configured to effectuate conversion between electrical and mechanical energy, generating one or more types of requisite torque. The driving device 62 may comprise, without limitation: electric motors 621 and speed reduction gear assemblies 622.

The connecting shaft 40 is a rotary shaft extending through the vehicle body 10 along a predetermined direction. Supported by components such as steering bearings, it can rotate relative to the vehicle body 10 about the predetermined direction, thereby achieving synchronized rotation between the steering control member 20 and the guide frame 30.

In the present embodiment, the two ends of the connecting shaft 40 extending away from each other along the predetermined direction are respectively referred to as a "first end" and a "second end". The steering control member 20 is fixedly connected to the first end of the connecting shaft, positioned at the top of the guide portion 10B. The guide frame 30 is fixedly connected to the second end of the connecting shaft, positioned at the bottom of the guide portion 10B. Thus, driven by the connecting shaft 40, the guide frame 30 can rotate synchronously with the steering control member 20.

Figure 9:
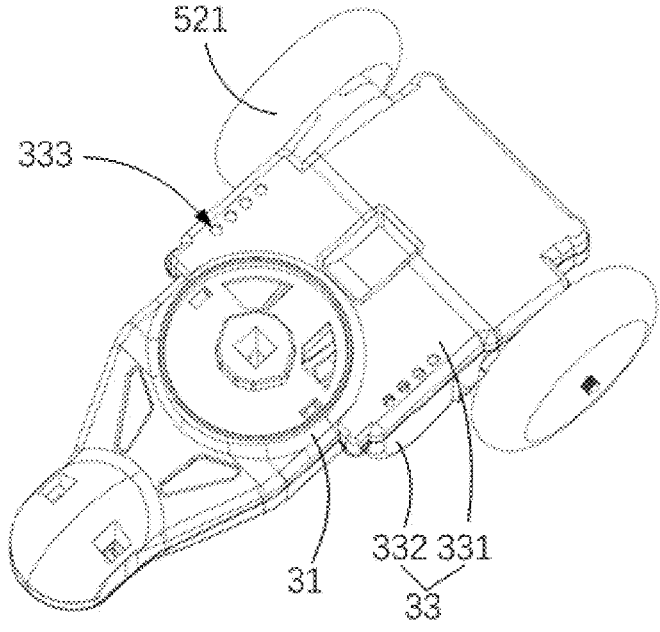
FIG. 9 is a structural schematic view of the guide frame according to an embodiment of the present application, showing a state with the support bracket removed.

The plurality of wheels 50 can be mounted on the vehicle body 10 and the guide frame 30 respectively. Specifically, with continued reference to FIG. 1, the wheels mounted on the vehicle body 10 may be referred to as "rear wheel 51", while the wheels mounted on the guide frame 30 may be referred to as "front wheel 52". As shown in FIG. 9, a portion of the front wheels 52 is directly connected to the power output terminal of the driving device 62. These wheels serve as drive wheels 521, configured to propel the electric swing car forward.

In a preferred embodiment, the guide frame 30 is further configured with anti-tilt wheels 522 that are mechanically independent from the power output terminal of the driving device 62. The anti-tilt wheels 522 are dimensioned smaller relative to the drive wheels 521.

During normal operational conditions of the electric swing car, the anti-tilt wheels 522 are configured to maintain clearance from the ground surface. However, upon inclination of the vehicle body 10 (such as during user ingress/egress or postural adjustments), the anti-tilt wheels 522 are configured to engage with the ground surface, thereby establishing support points for the vehicle body 10 and restricting further inclination thereof, thus preventing user falls or other safety incidents that may result from excessive lateral inclination angles of the vehicle body 10.

Figure 5:
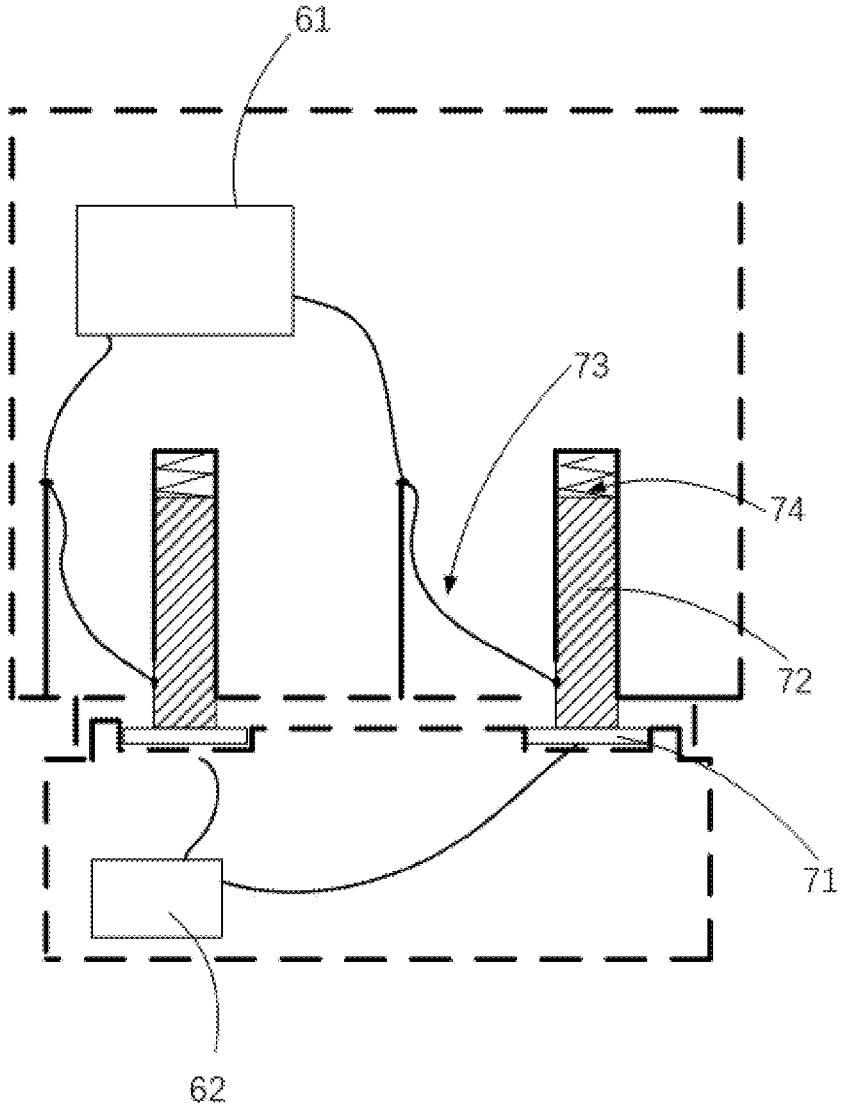
FIG. 5 is a structural schematic view of an electrical contact assembly according to an embodiment of the present application.
Figure 6:
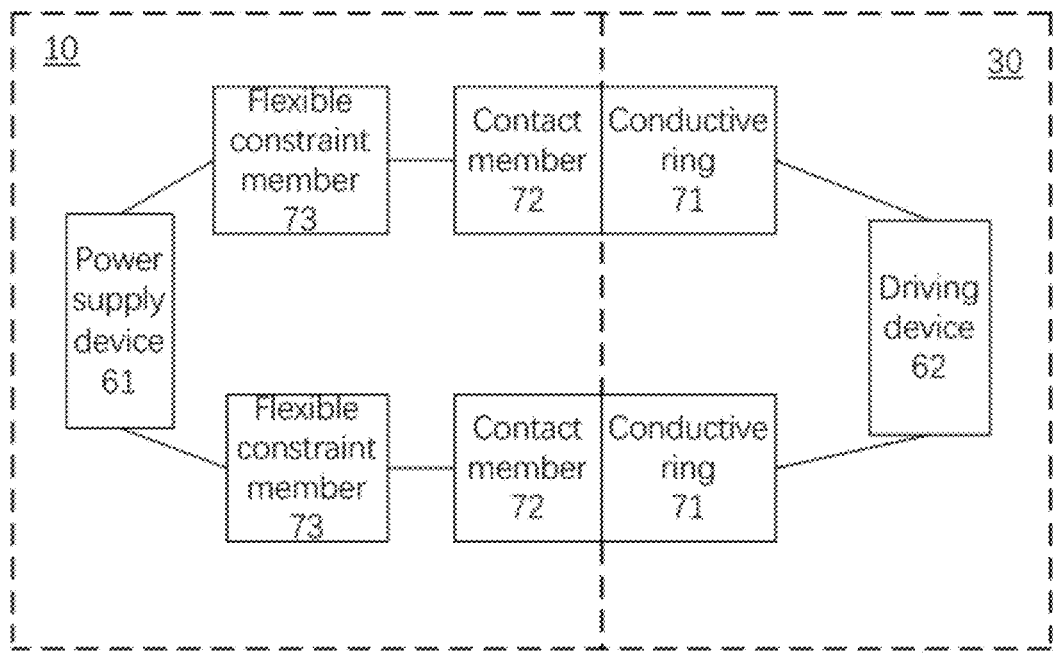
FIG. 6 is a schematic diagram of an electrical power transmission circuit according to an embodiment of the present application.

As shown in FIGS. 5 and 6, components for implementing electrical power transmission between the vehicle body 10 and the guide frame 30 includes: a conductive ring 71 and a contact member 72.

The conductive ring 71 is a component mounted on the guide frame 30. It establishes electrical connection with the driving device 62.

Figure 11:
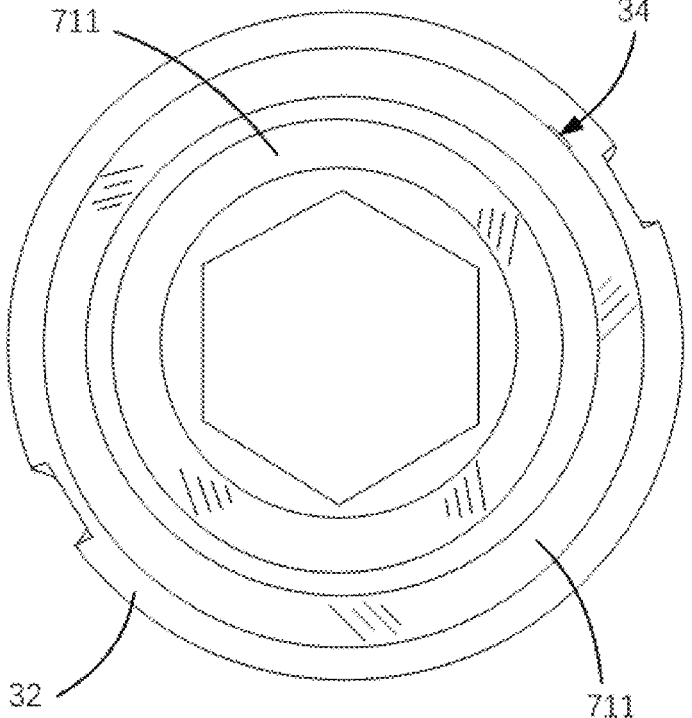
FIG. 11 is a structural schematic view of a support bracket according to an embodiment of the present application.

Exemplarily, as shown in FIG. 11, the portion of the conductive ring 71 exposed on the outer surface of the guide frame 30 includes an annular structure circumferentially disposed around the connecting shaft 40. In other embodiments, the portion of the conductive ring 71 exposed on the outer surface of the guide frame 30 may constitute only a partial segment of the annular structure, rather than forming a completely enclosed arc segment.

The arcuate extent of the conductive ring 71 is configured in accordance with the relative rotational angular range between the guide frame 30 and the vehicle body 10, wherein the arcuate extent is sufficient to maintain coverage throughout the rotational range of the guide frame 30.

The contact member 72 is a movable component that can move relative to the vehicle body 10 along the predetermined direction. After the guide frame 30 is assembled to the vehicle body 10, the movable contact member 72 can adapt to different gap variations, maintaining close physical contact with the conductive ring 71.

Figure 4:
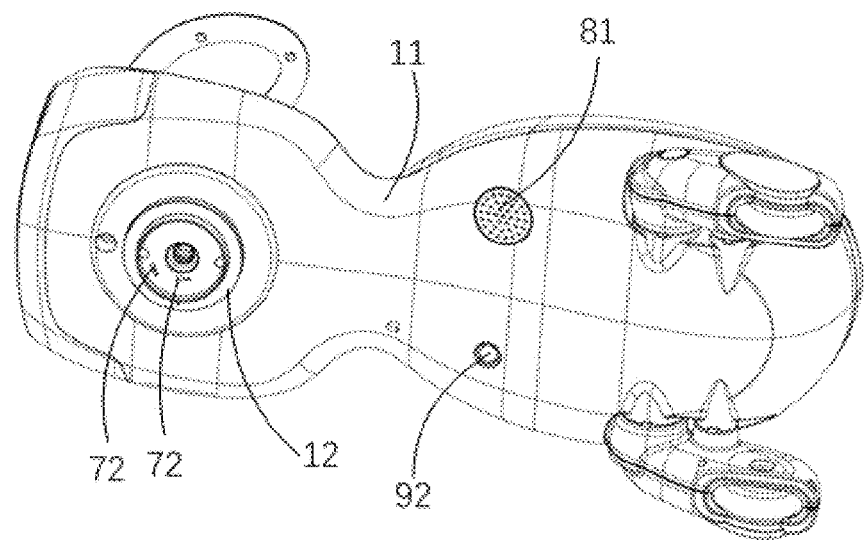
FIG. 4 is a structural schematic view of the electric swing car according to an embodiment of the present application, showing a state with the guide frame removed.

Exemplarily, as shown in FIG. 4, in its natural state, the contact member 72 protrudes from the vehicle body 10. Alternatively, when the conductive ring 71 is configured to protrude from the outer surface of the guide frame 30 and enters into the interior of the vehicle body 10 after assembly, the contact member 72 may also be configured to be recessed within the vehicle body 10 while maintaining close physical contact with the conductive ring 71.

In some embodiments, with continued reference to FIGS. 5 and 6, the device may further includes: a flexible constraint member 73.

The flexible constraint member 73 is a structural component configured to constrain the contact member 72. In the present application, the term "flexible" is distinguished from rigid constraint, indicating and describing that the constraint member possesses bendable and deformable characteristics. For example, the flexible constraint member may be a rope, flexible wire, or strip-like object that is capable of bending and deformation.

One end of the flexible constraint member 73 is fixed within the vehicle body and establishes electrical connection with the power supply device 61 through means such as wires. The other end extends to and is fixedly connected to the contact member 72, thereby imposing constraint on the contact member 72, ensuring that the sliding movement of the contact member 72 does not exceed the maximum displacement relative to the vehicle body, preventing the contact member 72 from detaching from within the vehicle body.

Figure 14:
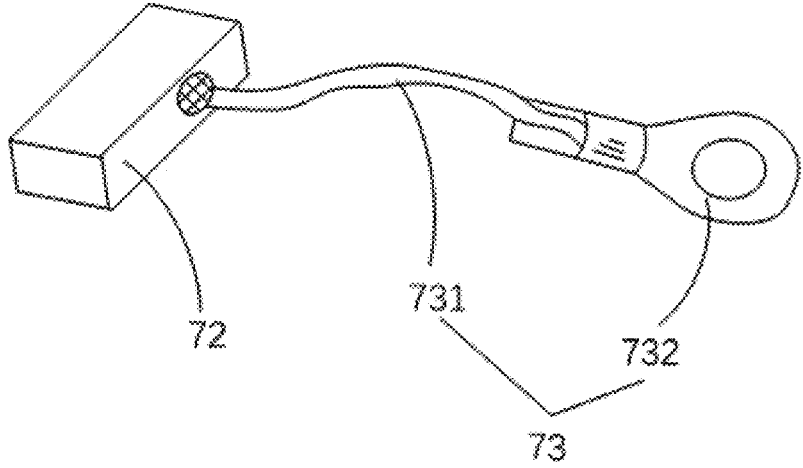
FIG. 14 is a connection schematic view of a flexible constraint member and a contact member according to an embodiment of the present application.

Specifically, as shown in FIG. 14, to facilitate installation and fixation of the flexible constraint member 73, in addition to its bendable flexible body 731, a connection tab 732 may be provided at one end thereof. Screws or other similar fastening components may pass through the connection tab 732 to secure one end of the flexible constraint member 73 to the top of a fixed structure.

Such a flexible constraint member is easy to install and adjust, featuring simple structure and resistance to failure. During long-term use of the electric swing car, it provides enhanced reliability and is less prone to constraint failure issues.

In some embodiment, both the contact member 72 and the flexible constraint member 73 are made of conductive materials, thereby forming the electrical power transmission circuit shown in FIG. 6, enabling power transmission from the power supply device 61 to the driving device 62. Exemplarily, the flexible constraint member 73 is formed by intertwining multiple strands of soft copper wire, providing sufficient mechanical strength and excellent conductivity. The contact member 72 is made of graphite, ensuring reliability during long-term use.

It shall be understood that those skilled in the art may implement alternative suitable conductive materials. For example, the flexible constraint member 73 may alternatively be made of aluminum wire. The contact member 72 may be constructed from metal-graphite composite materials, copper alloys, or aluminum alloys.

Specifically, to ensure formation of a complete electrical power transmission circuit, both the conductive ring 71 and the contact member 72 are provided in pairs. Correspondingly, the flexible constraint member 73 is also provided in pairs.

The two conductive rings 71 are electrically isolated from each other and concentrically arranged, ensuring that the two contact members 72 maintain respective physical contact with corresponding conductive rings 71 at any rotational angle of the guide frame 30 relative to the vehicle body 10.

In operational implementation, one flexible constraint member 73 is electrically connected to the positive terminal (+) of the power supply device, while the other flexible constraint member 73 is electrically connected to the negative terminal (−) thereof. The two conductive rings 71 are respectively connected to a pair of power receiving terminals of the driving device (for example, DC input terminals of the motor drive circuit).

Thus, through the physical contact between the two contact members 72 and their corresponding conductive rings 71, electrical connection between the power supply device 61 and the driving device 62 can be achieved, forming a complete electrical power transmission circuit.

Through the cooperative arrangement of the conductive ring 71, contact member 72, and flexible constraint member 73, electrical connection between the power supply device 61 and the driving device 62 can be achieved without requiring wires spanning across the vehicle body and guide frame.

Moreover, the circumferentially arranged conductive ring 71 surrounding the connecting shaft 40 ensures that the contact member 72 maintains physical contact with the conductive ring 71 at any rotational angle of the guide frame 30, eliminating the need for unnecessary restrictions on the rotation angle of the guide frame. Thus, this configuration overcomes the compatibility issues between the split configuration and the electric drive system.

In some embodiments, to facilitate assembly and production, the contact member 72 and flexible constraint member 73 may be disposed on an independent component, which is detachably assembled to the vehicle body.

For simplicity of description, the independent component carrying the contact member 72 and flexible constraint member 73 is hereinafter referred to as "mounting bracket 12," while the remaining main portion constituting the vehicle body is referred to as "vehicle shell 11". The mounting bracket 12 and the vehicle shell 11 may be fixedly connected through any suitable type of detachable assembly method, such as screw fastening, snap-fitting, or adhesive bonding.

Figure 7:
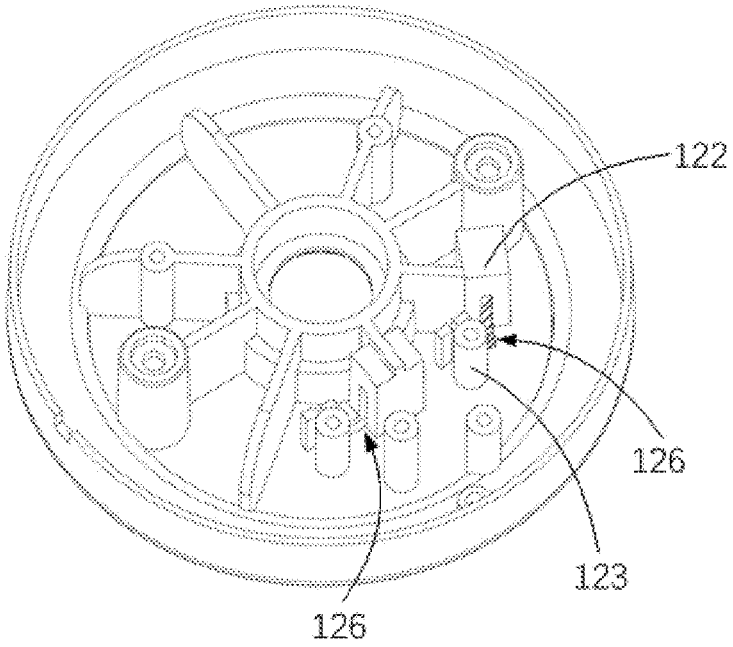
FIG. 7 is a structural schematic view of a mounting bracket according to an embodiment of the present application.
Figure 8:
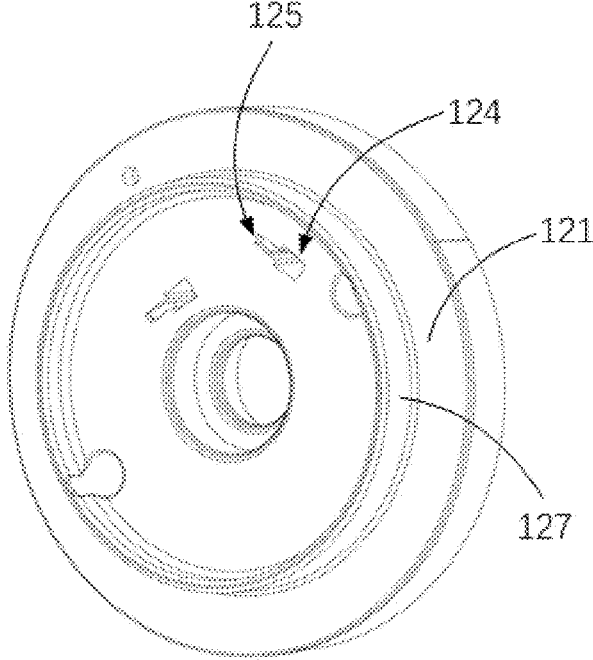
FIG. 8 is a structural schematic view of the mounting bracket from another perspective according to an embodiment of the present application.

As shown in FIGS. 7 and 8, the mounting bracket 12 includes: a bracket body 121, a guide sliding groove 122, and a terminal post 123.

The bracket body 121 constitutes the main structural portion of the mounting bracket 12. FIGS. 7 and 8 exemplarily show a substantially cylindrical symmetric shape. Based on different design requirements, it may be configured into any other suitable shape.

Two mutually opposing surfaces of the bracket body 121 are respectively designated as a first surface and a second surface. The first surface is the surface of the bracket body 121 that interfaces with the vehicle shell 11. Correspondingly, the second surface constitutes a portion of the external surface of the vehicle body.

The guide sliding groove 122 is provided in the bracket body 121. It is disposed along a predetermined direction and forms a first opening 124 at its open end on the bracket body 121. The contact member 72 is a sliding block partially accommodated within the guide sliding groove 122 and partially protruding through the first opening 124 beyond the bracket body 121.

The first opening 124 matches the outer profile of the contact member 72, ensuring that the contact member 72 can smoothly pass through the first opening 124 and slide along the predetermined direction under the guidance of the guide sliding groove 122. The term "matches" indicates that the shape and dimensions of the first opening correspond to the external profile shape and dimensions of the contact member, fitting together like puzzle pieces, to ensure stable cooperation between the two components and prevent relative positional deviation.

For simplicity of description, two opposing ends of the contact member 72 are respectively designated as a "first end portion" and a "second end portion." The first end portion refers to the end of the contact member 72 protruding from the vehicle body, while the second end portion refers to the other end accommodated within the guide sliding groove.

In some embodiments, with continued reference to FIG. 5, an additional elastic member 74 (for example, a compression spring) may be disposed within the guide sliding groove 122. The two ends of the elastic member 74 respectively abut against the contact member 72 and the bottom wall of the guide sliding groove 122, providing elastic force to support partial protrusion of the contact member 72 from the bracket body 121.

The terminal post 123 is a structure for securing the flexible constraint member 73. It may be disposed on the bracket body 121 proximate to the guide sliding groove 122, wherein one end of the flexible constraint member 73 is secured to the end of the terminal post 123 via fasteners such as screws.

The end of the terminal post 123 further simultaneously secures conductors connected to the driving device, thereby achieving both fixation of the flexible constraint member 73 and electrical connection with the driving device 62.

Specifically, to enhance constraint capability, the extending end of the flexible constraint member 73 may be fixedly connected at a position as close as possible to the first end portion of the contact member. In other words, the connection node between the contact member 72 and the flexible constraint member 73 should be positioned as far as possible from the second end portion along the predetermined direction.

The term "as close as possible" refers to instances where the distance between the connection node formed by the extending end of the flexible constraint member 73 and the first end portion of the contact member is less than a predetermined value. The predetermined value may be an absolute value, such as 1 cm, 3 cm, or 5 cm. In other embodiments, the predetermined value may be a proportional value, such as 10%, 30%, or 50% of the total length of the contact member.

It shall be understood that those skilled in the art may implement alternative absolute values or proportional values in accordance with practical requirements or specific structural parameters.

In some embodiments, with continued reference to FIG. 8, in addition to the first opening, the bracket body may further define a second opening 125 extending outwardly from the edge of the first opening for a certain distance. The term "extending outwardly" refers to expansion and continuation in a direction away from the first opening, with the edge of the first opening serving as a starting point. The first opening 124 and the second opening 125 are in communication with each other.

Furthermore, the second opening 125 has a width dimension smaller than that of the first opening 124, ensuring that the contact member 72 is confined within the first opening 124 and prevented from entering the second opening 125.

Correspondingly, as shown in FIG. 7, the guide sliding groove 122 is provided with a first gap 126 for passage of the flexible constraint member 73. Such configuration of the first gap 126 and second opening 125 provides substantial convenience for arrangement of the flexible constraint member 73, and allows the flexible constraint member 73 to be fixedly connected at a position closer to the first end portion of the contact member 72.

In some embodiments, the first gap 126 and second opening 125 are in communication with each other, allowing the flexible constraint member 73 to be freely positioned therein. Alternatively, the first gap 126 and second opening 125 may not be in communication with each other, merely providing space for placement and accommodation of the flexible constraint member 73.

In operational implementation, the contact member 72 is accommodated within the guide sliding groove 122 and, under the guidance of the guide sliding groove 122, is constrained to move only along the predetermined direction.

The elastic member 74 provides elastic force to urge the contact member 72 away from the bottom wall of the guide sliding groove 122, driving and supporting the contact member 72 to protrude from the bracket body 121.

When the contact member 72 reaches its limit position of protrusion, it is constrained by the flexible constraint member 73 from further outward movement, thereby maintaining its position within the guide sliding groove 122 and preventing disengagement from the bracket body 121.

Thus, under the combined action of the guide sliding groove 122, elastic member 74, and flexible constraint member 73, the contact member 72 maintains its position at the limit of protrusion from the bracket body 121. When subjected to external compression, the contact member 72 can retract along the predetermined direction. This self-protruding capability of the contact member 72 enables adaptation to gaps of varying sizes, maintaining physical contact with the conductive ring 71 under various practical application conditions.

Alternatively, pursuant to equivalent structural design principles, the guide sliding groove 122 may be replaced with other guiding structures providing equivalent guiding function (for example, a guide rod extending along the predetermined direction, wherein the contact member is fitted over and slides along the guide rod). The terminal post 123 may be replaced with other fixing structures that similarly provide mounting positions (for example, a retaining recess configured to match the flexible constraint member, wherein the flexible constraint member is secured therein through engagement).

In some embodiments, as shown in FIG. 8, the second surface of the bracket body 12 may further includes a positioning flange 127. As shown in FIG. 9, the guide frame 30 includes a complementary positioning notch 31 at a position corresponding to the bracket body 12.

Thus, through the cooperative engagement between the positioning flange 127 and the positioning notch 31, corresponding positioning and guiding functions are achieved, ensuring accurate placement of the guide frame 30 at positions corresponding to the bracket body 12 on the vehicle body.

Furthermore, the positioning flange 127 may be a continuous closed annular protrusion, thereby defining an inner region within the positioning flange and an outer region around the periphery of the positioning flange on the second surface of the bracket body. By forming the first opening 124 within the inner region, both the contact member and the conductive ring are enclosed within the internal space formed by the annular protrusion 127.

More particularly, the positioning flange 127 is a continuous annular protrusion circumferentially disposed around the connecting shaft as its central axis. Such continuous annular protrusion may further provide guiding function, enabling improved synchronous rotation of the guide frame 30 with the direction control member 20.

In some embodiments, to facilitate assembly and production, the conductive ring 71 may be disposed on a separate component that is detachably assembled to the guide frame 30.

For purposes of descriptive clarity, the separate component carrying the conductive ring 71 is hereinafter referred to as "support bracket 32," while the remaining principal portion constituting the guide frame is referred to as "guide frame body 33." These components may be fixedly connected through any suitable type of detachable assembly means, such as screw fastening, snap-fit fastening, or adhesive bonding.

Figure 12:
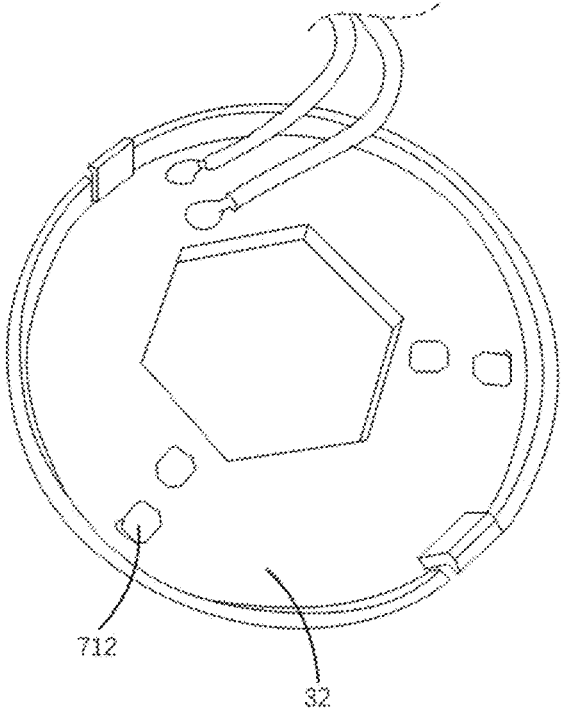
FIG. 12 is a structural schematic view of the support bracket from another perspective according to an embodiment of the present application.

Specifically, as shown in FIGS. 11 and 12, the conductive ring 71 may comprise an annular plate body 711 and a fixing portion 712. Two mutually opposing surfaces of the support bracket 32 are respectively designated as a "third surface" and a "fourth surface." The third surface refers to the side proximate to the vehicle body, which constitutes a portion of the outer surface of the guide frame.

The fixing portion 712 extends outwardly from the annular plate body 711. It may have an appropriate length to extend through a second gap 34 formed in the support bracket 32 and fold against the fourth surface of the support bracket 32, forming a snap-fit-like structure that secures the annular plate body 711 to the third surface of the support bracket 32, thereby forming the conductive ring 71.

Since the entire conductive ring 71 is an integrated structure of conductive material, as shown in FIG. 12, any fixing portion 712 engaging with the fourth surface may be selected as a connection point for establishing electrical connection between the conductive ring 71 and the driving device through wire soldering.

In some embodiments, as shown in FIGS. 9 and 10, the guide frame body 33 may include a first guide frame shell 331 and a second guide frame shell 332 connected together. The two guide frame shells enclose to form an accommodation space for housing the driving device 62.

The support bracket 32 is detachably assembled to the first guide frame shell 331. The driving device 62 and wheel are mounted on the second guide frame shell 332.

Specifically, the driving device 62 includes: a speed reduction transmission mechanism 621 and an electric motor 622. The electric motor 622 converts electrical energy into mechanical energy and transmits it to the speed reduction transmission mechanism 621. The speed reduction transmission mechanism 621 converts the output torque from the electric motor into desired torque, which is then transmitted to a portion of the front wheels, driving the electric swing car forward.

During operational implementation, the electric motor 622 may generate substantial heat. To enhance heat dissipation capability and ensure continuous reliable operation of the electric swing car, the second guide frame shell 332 may include multiple second ventilation holes 334 on both sides of the electric motor, while the first guide frame shell 331 includes multiple first ventilation holes 333 at positions corresponding to the second ventilation holes 334, thereby forming air passages traversing the accommodation space. Such through passages accelerate heat exchange between the accommodation space and external space, enhancing heat dissipation capability.

In some embodiments, further referring to FIG. 2, the vehicle shell 11 may comprise a main shell 111 having an opening end and a seat cover 112 mounted on the opening end.

In conventional non-powered swing cars, as the interior space does not require additional mounting positions, the main shell 111 may form a complete and continuous sidewall, thereby ensuring that the seat portion 10A formed jointly with the seat cover 112 mounted thereon possesses sufficient structural strength to support user pressure during riding.

However, with the addition of an electric drive system, specific mounting frameworks need to be formed within the main shell to provide one or more mounting positions for installation and securing of electronic devices such as energy storage units.

Such mounting frameworks compromise the continuity and integrity of the main shell 111, which may consequently result in insufficient support and structural strength for the seat cover 112.

Accordingly, as shown in FIG. 3, a portion of the mounting framework may extend to form an abutting structure 113 configured to support the seat cover 112.

The abutting structure 113 abuts against the seat cover 112, on one hand providing support to the seat cover 112 and ensuring sufficient structural strength thereof. On the other hand, the larger internal space formed by the abutting structure 113 may accommodate larger electronic devices, such as energy storage units or batteries, thereby achieving efficient space utilization.

It should be appreciated that, pursuant to varying practical application requirements, through utilization of the internally incorporated electric drive system, the electric swing car may be further configured with one or more functional units to effectuate enhanced functionality and further optimize user experience. The following description sets forth multiple exemplary embodiments of different functional units.

In some embodiments, with the support of the power supply device, the electric swing car may conveniently incorporate music playback functionality. As shown in FIG. 3, the electric swing car may further include a speaker 81 and a sound trigger button 82.

The speaker 81 may be accommodated and secured at a suitable mounting position within the vehicle body, capable of operating under power supplied by the power supply device to play one or multiple music tracks. The sound trigger button 82 is disposed on the outer surface of the vehicle body, allowing users to control the operating state of the speaker.

For example, users may activate the speaker 81 to emit sound by pressing the sound trigger button 82, and when the speaker 81 is operating and playing music, pressing the sound trigger button 82 again will stop the speaker 81 operation.

In other embodiments, as shown in FIG. 4, the electric swing car may further include an additional main power switch 92. The main power switch 92 serves as the primary switch for controlling the power supply device. It can control or disconnect power to all electrical devices within the electric swing car.

Specifically, the main power switch 92 may adopt a button-type design, installed at an easily accessible position on the vehicle body surface. Users can achieve switch activation or deactivation through a single press. Thus, when the main power switch 92 is in the off position, all electrical devices of the entire electric swing car are inoperable, ensuring safe use and storage.

Figure 13:
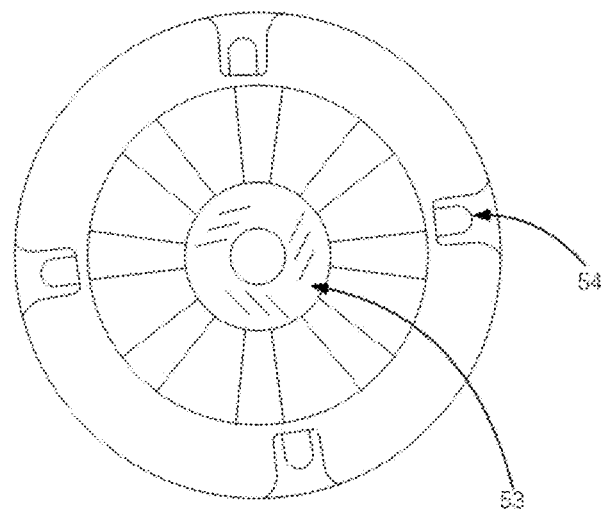
FIG. 13 is a schematic view of a self-illuminating wheel according to an embodiment of the present application.

In further embodiments, at least one of the wheels 50 may be configured as a self-illuminating wheel. As shown in FIG. 13, the self-illuminating wheel refers to a wheel that automatically illuminates with rotation, creating specific lighting effects.

It consists of a hub 53 and multiple LED beads 54 uniformly distributed along the hub axis. During wheel rotation, induced electromotive force is generated when the wire coils between the hub and wheel axle cut through magnetic field lines, thereby illuminating the LED beads 54.

The foregoing description is provided with reference to specific/preferred embodiments for detailed elucidation of the present application, wherein implementation of the present application shall not be constrained to the descriptions. Those of ordinary skill in the art may effectuate various modifications and improvements without departing from the inventive concept of the present application, wherein all such modifications and improvements are encompassed within the scope of protection of the present application.

The invention claimed is:

1. An electric swing car, comprising:
   a vehicle body;
   a power supply device provided within the vehicle body;
   a connecting shaft penetrating through the vehicle body along a predetermined direction, wherein the connecting shaft has a first end and a second end mutually facing away along the predetermined direction;
   a steering control member fixedly connected to the first end of the connecting shaft;
   a guide frame fixedly connected to the second end of the connecting shaft;
   a driving device provided within the guide frame;

a plurality of wheels assembled on the vehicle body and the guide frame;

a conductive ring electrically connected to the driving device, wherein the conductive ring is disposed on the guide frame;

a contact member connected to the vehicle body, wherein the contact member maintains physical contact with the conductive ring, and the contact member is made of conductive material and is electrically connected to the power supply device.

2. The electric swing car according to claim 1, wherein the contact member is movably disposed along the predetermined direction, and the electric swing car further comprising: a flexible constraint member made of conductive material;

wherein one end of the flexible constraint member is fixed within the vehicle body, and another end of the flexible constraint member extends to fixedly connect with the contact member;

wherein the flexible constraint member is configured to:

apply restraining limitation when the contact member moves to an extreme position relative to the vehicle body, to maintain connection between the contact member and the vehicle body.

3. The electric swing car according to claim 2, wherein the vehicle body comprises:

a vehicle shell forming a seat portion for riding and a guide portion located at the front end of the seat portion;

a mounting bracket detachably assembled on the guide portion, wherein the contact member and the flexible constraint member are disposed on the mounting bracket;

wherein the mounting bracket comprises:

a bracket body having a first opening shaped to conform to an outer peripheral contour of the contact member, wherein the bracket body has a first surface and a second surface opposite to each other, the first surface being joined with the vehicle shell;

a guide structure extending along the predetermined direction from the first surface, configured to guide the contact member to move along the predetermined direction;

a fixing structure adjacent to the guide structure, wherein the fixing structure is located on the first surface of the bracket body and fixedly connected to the flexible restraining component.

4. The electric swing car according to claim 3, wherein the guide structure is a guide sliding groove disposed along the predetermined direction, and an opening end of the guide sliding groove forms the first opening;

wherein the contact member is a sliding block matching the guide sliding groove, and a portion of the sliding block is accommodated within the guide sliding groove and slides along the predetermined direction;

wherein the fixing structure is a terminal post and one end of the flexible constraint member is locked to a top of the terminal post.

5. The electric swing car according to claim 4, further comprising a connecting wire;

wherein one end of the connecting wire is electrically connected to the power supply device, and another end of the connecting wire and the flexible constraint member are jointly secured and electrically connected to the top of the terminal post.

6. The electric swing car according to claim 4, wherein the bracket body further comprises:

a second opening extending outward from an edge of the first opening;

wherein the second opening has a width dimension smaller than the first opening to restrict the contact member within the first opening;

wherein a first gap is provided in aside wall of the guide sliding groove for the flexible constraint member to pass through.

7. The electric swing car according to claim 4, wherein the mounting bracket further comprises an elastic element disposed within the guide sliding groove;

wherein both ends of the elastic element abut against the contact member and a bottom wall of the guide sliding groove respectively, the bottom wall being a wall surface opposite to the first opening.

8. The electric swing car according to claim 4, wherein a distance between a connection node of the contact member and a first end portion of the contact member is less than a predetermined value;

wherein the connection node is a position where the flexible constraint member is fixedly connected to the contact member, and the first end portion is an end portion of the contact member protruding from the vehicle body.

9. The electric swing car according to claim 3, wherein the mounting bracket further comprises a positioning flange disposed on the second surface of the bracket body;

wherein the positioning flange divides the second surface of the bracket body into an inner region bounded by the positioning flange and an outer region external to the positioning flange, the first opening being disposed in the inner region;

wherein the guide frame further comprises a positioning notch matching the positioning flange, wherein the positioning flange is accommodated within the positioning notch.

10. The electric swing car according to claim 3, wherein the vehicle shell comprises:

a main shell, wherein an interior of the main shell forms a mounting frame providing one or more mounting positions, the main shell having an opening end at the seat portion;

a seat cover covering the opening end of the main shell at the seat portion;

wherein a portion of the mounting frame extends to form an abutting structure, the abutting structure abutting against the seat cover to support the seat cover.

11. The electric swing car according to claim 10, further comprising a speaker and a sound trigger button;

wherein the speaker is fixed at a mounting position provided by the mounting frame, and the trigger button is disposed on an outer surface of the main shell for controlling an operating state of the speaker.

12. The electric swing car according to claim 3, wherein the vehicle shell further forms foot platforms on both sides of the guide portion;

wherein an electronic throttle pedal for controlling the driving device is disposed on one of the foot platforms.

13. The electric swing car according to claim 2, wherein the wheels comprise a plurality of front wheels assembled on the guide frame and a plurality of rear wheels assembled on the vehicle body;

wherein at least two of the front wheels are connected to the driving device to form drive wheels.

14. The electric swing car according to claim 1, wherein the guide frame comprises:

a guide frame body, wherein the driving device is fixedly mounted within the guide frame body;

a support bracket detachably assembled on the guide frame body, wherein the conductive ring is disposed on the support bracket.

15. The electric swing car according to claim 14, wherein the support bracket has a plurality of second gaps;

wherein the conductive ring comprises:

an annular plate-shaped body covering the support bracket;

a plurality of fixing portions extending outward from the plate-shaped body, wherein at least one of the plurality of fixing portions passes through one of the plurality of second gaps to fix a position of the plate-shaped body on the support bracket.

16. The electric swing car according to claim 15, wherein the support bracket has mutually facing-away third surface and fourth surface, wherein the third surface of the support bracket is a surface proximate to the vehicle body;

wherein the at least one of the plurality of fixing portions passing through one of the plurality of the second gaps forms a connection point on the fourth surface of the support bracket, the connection point being electrically connected to the driving device through a wire.

17. The electric swing car according to claim 14, wherein the guide frame body comprises:

a first guide frame shell, wherein the support bracket is detachably assembled on the first guide frame shell;

a second guide frame shell, wherein the second guide frame shell connects with the first guide frame shell to form an accommodation space for containing the driving device, the driving device being fixedly mounted on the second guide frame shell.

18. The electric swing car according to claim 17, wherein the driving device comprises a speed reduction transmission mechanism and an electric motor;

wherein the second guide frame shell has a plurality of second ventilation holes on both sides of the electric motor;

wherein the first guide frame shell has corresponding first ventilation holes at positions opposite to the second ventilation holes, forming an air passage penetrating through the accommodation space.

19. The electric swing car according to claim 1, wherein at least one of the plurality of wheels is a self-illuminating wheel;

wherein the self-illuminating wheel comprises a hub and a plurality of LED beads uniformly distributed along a hub axis, wherein the LED beads illuminate with rotation of the hub.

20. The electric swing car according to claim 1, wherein both the conductive ring and the contact member are provided in pairs;

wherein the pair of conductive rings are electrically isolated from each other and coaxially arranged, with an axis of the connecting shaft coinciding with an axis of the conductive rings;

wherein the pair of contact members maintain physical contact with corresponding conductive rings respectively, to form an electrical energy transmission circuit between the contact members and the conductive ring.

\* \* \* \* \*